US008422735B2

(12) United States Patent
Kim

(10) Patent No.: US 8,422,735 B2
(45) Date of Patent: Apr. 16, 2013

(54) IMAGING APPARATUS FOR DETECTING A SCENE WHERE A PERSON APPEARS AND A DETECTING METHOD THEREOF

(75) Inventor: Myeong-bo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 963 days.

(21) Appl. No.: 12/060,310

(22) Filed: Apr. 1, 2008

(65) Prior Publication Data

US 2009/0110247 A1 Apr. 30, 2009

(30) Foreign Application Priority Data

Oct. 25, 2007 (KR) .................. 10-2007-0107980

(51) Int. Cl.
*G06K 9/00* (2006.01)
(52) U.S. Cl.
USPC .......................................... 382/103; 382/118
(58) Field of Classification Search .................. 382/103
See application file for complete search history.

(56) References Cited

U.S. PATENT DOCUMENTS

| 6,975,346 | B2 * | 12/2005 | Kumhyr ........................ 348/143 |
| 7,035,440 | B2 * | 4/2006 | Kaku ............................. 382/115 |
| 7,277,891 | B2 * | 10/2007 | Howard et al. ............... 707/707 |
| 2002/0136433 | A1 * | 9/2002 | Lin .............................. 382/118 |
| 2004/0093349 | A1 * | 5/2004 | Buinevicius et al. ....... 707/104.1 |
| 2004/0109587 | A1 * | 6/2004 | Segawa et al. ............... 382/115 |
| 2004/0117638 | A1 * | 6/2004 | Monroe ........................ 713/186 |
| 2004/0126038 | A1 | 7/2004 | Aublant et al. |
| 2006/0008150 | A1 | 1/2006 | Zhao et al. |
| 2006/0056667 | A1 * | 3/2006 | Waters .......................... 382/118 |
| 2006/0190419 | A1 * | 8/2006 | Bunn et al. ...................... 706/2 |
| 2006/0223628 | A1 * | 10/2006 | Walker et al. ................. 463/20 |
| 2006/0247016 | A1 * | 11/2006 | Walker et al. ................. 463/20 |
| 2007/0098303 | A1 | 5/2007 | Gallagher et al. |
| 2007/0230799 | A1 * | 10/2007 | Shniberg et al. ............. 382/224 |

FOREIGN PATENT DOCUMENTS

| JP | 2001-167110 | 6/2001 |
| WO | 03/049430 A2 | 6/2003 |

OTHER PUBLICATIONS

Search Report issued by the European Patent Office in European Patent Application No. 08153382.0-2218 on Feb. 3, 2009.
European Examination Report issued Sep. 16, 2010 in EP Application No. 08153382.0.
Examination Report issued in European Patent Application No. 08 153 382.0 on Aug. 23, 2011.

* cited by examiner

*Primary Examiner* — David Zarka
(74) *Attorney, Agent, or Firm* — Stanzione & Kim, LLP

(57) ABSTRACT

An imaging device for detecting a scene where a person appears, and a detecting method thereof, are provided. The imaging device compares a representative image of a person, with persons detected in the generated images, to detect scenes where the person appears. Information about the detected scene is stored, along with the generated images. A list of the detected persons is provided to a user, to enable the user to select and edit images that include the selected persons.

20 Claims, 4 Drawing Sheets

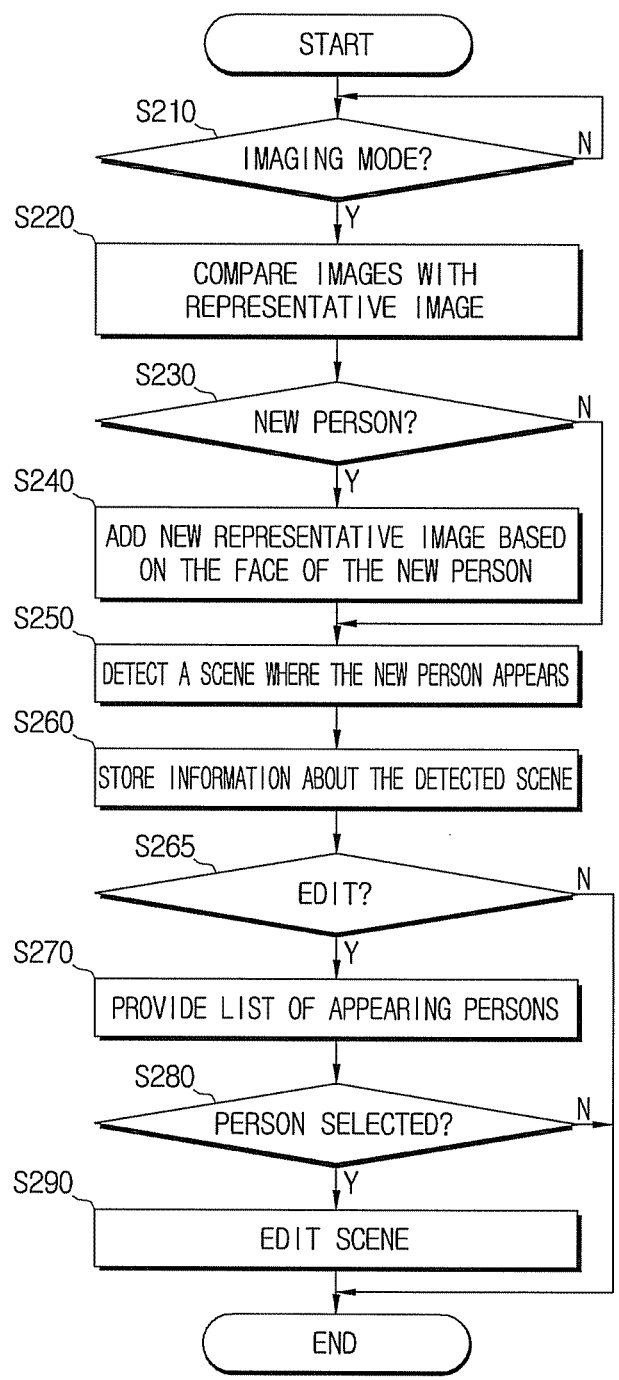

IMAGING APPARATUS FOR DETECTING A SCENE WHERE A PERSON APPEARS AND A DETECTING METHOD THEREOF

CROSS-REFERENCE TO RELATED APPLICATION

This application claims the benefit of Korean Application No. 2007-107980, filed Oct. 25, 2007 in the Korean Intellectual Property Office, the disclosure of which is incorporated herein by reference.

BACKGROUND OF THE INVENTION

1. Field of the Invention

Aspects of the present invention relate generally to an imaging apparatus. More particularly, aspects of the present invention relate to an imaging apparatus capable of generating and storing an image, and reproducing the stored image.

2. Description of the Related Art

The remarkable developments in the field of digital technology were incorporated into various electronic devices, to provide more diverse content. The electronic devices have data storage devices that are sufficient to store the diverse content.

The widespread use of electronic devices, in particular digital cameras and/or digital camcorders, require a storage medium to contain a vast amount of image content. However, the increased convenience in terms of space compromises convenience in terms of time. That is, it takes a considerable amount of time for a user to search and edit the vast amount of content stored in the storage medium. Accordingly, the user has to use functions, such as fast playback, to find and select particular images.

As explained above, to store, delete, or reproduce scenes featuring a particular person, the user has to manipulate the device, and manually determine whether the particular person is captured in the images of a scene, and thus, experiences inconvenience. Therefore, an editing method is required to enables a user to easily edit the vast amount of data stored in an electronic device.

SUMMARY OF THE INVENTION

Several aspects and exemplary embodiments of the present invention provide an imaging apparatus for comparing an image with a previously stored representative image, to detect particular persons appearing in the image, to enable fast and easy editing of a file; and a detecting method utilizing the same.

According to an aspect of the present invention, an imaging device is provided. The device includes: a first storage unit to classify representative images, according to the faces of persons appearing therein, and to store the representative images; an imaging unit to generate images; a second storage unit to store the generated images as scenes; and a control unit to detect persons appearing in images of the scenes, to compare detected persons with the representative images, so as to identify the detected persons, and to control the second storage unit to store information about the scenes that include the identified persons, along with the scenes.

According to another aspect of the present invention, if a detected person is not identified, the control unit adds at least one of the images, which includes the face of the unidentified person, to the representative images in the first storage unit, so as to identify the person.

According to another aspect of the present invention, the control unit adds information about the scenes that include the previously unidentified person to the information about the scenes.

According to another aspect of the present invention, the control unit provides a list of persons that appear in the scenes, to enable selecting and editing the images of each of the persons, and if at least one of the persons is selected from the list, the control unit edits the scenes that include the selected person, using the information about the scenes.

According to another aspect of the present invention, the list includes an image that includes the face of one of the persons appearing in the list.

According to another aspect of the present invention, the editing process comprises at least one of a save operation, a playback operation, a delete operation, and a skip operation, with respect to each of the persons appearing in the images.

According to another aspect of the present invention, a detecting method is provided. The detecting method includes generating images, storing the images in the basis of a scene unit, comparing representative images, which are classified and stored according to faces of persons, with the images, detecting a scene of the images in which at least one of the persons of the representative images appears, and storing information about the detected scene with the photographed images.

According to another aspect of the present invention, if a face of a person appearing in the images is not found from the representative images, at least one image including the face is added to the representative images.

According to another aspect of the present invention, the detecting method further includes detecting a scene in which the person of the added representative image appears, and storing information about the detected scene with the images.

According to another aspect of the present invention, the detecting method further includes providing a list of persons appearing in scenes, to enable selecting and editing the images of each of the persons, and if at least one of the persons is selected from the list, editing a scene of the photographed images in which the selected person appears, using information about the scene.

According to another aspect of the present invention, the list of persons includes an image of each person in the list.

According to another aspect of the present invention, the editing process may include at least one of a save operation, a playback operation, a delete operation, and a skip operation, with respect to each of the persons appearing in the photographed images.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flowchart provided to explain a detecting method, according to an exemplary embodiment of the present invention.

DETAILED DESCRIPTION OF THE EMBODIMENTS

Figure 1:
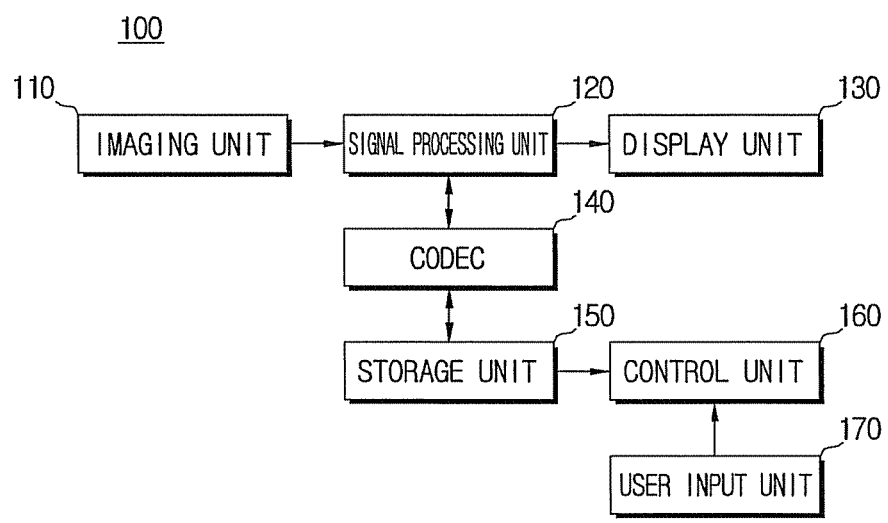
FIG. 1 is a block diagram of an interior structure of a digital camcorder, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a block diagram illustrating an interior structure of a digital camcorder 100, according to an exemplary embodiment of the present invention. Referring to FIG. 1, the digital camcorder 100 includes an imaging unit 110, a signal processing unit 120, a display 130, a CODEC 140, a storage unit 150, a control unit 160, and a user input unit 170. While described as a camcorder, it is understood that aspects of the invention can be used in a digital camera, a scanning apparatus, and other imaging apparatuses that capture and/or store images digitally.

The imaging unit 110 captures light focus through a lens, and converts the light into an electric signal, to generate an image signal (image). The signal processing unit 120 performs signal processing, such as, color signal processing, gamma correction, hand tremor compensation, or digital zooming, on the image signals generated by the imaging unit 110. The display 130 shows the image signal output from the signal processing unit 120, so that a user can view the images.

The CODEC 140 compresses the image signals output from the signal processing unit 120, into a predetermined compression format. A compression format, such as MPEG, or H.264, may be implemented by the CODEC 140. While these formats are mentioned only for examples, one will understand that other adequate compression formats may be applied.

The storage unit 150 records the compressed image signals from the CODEC 140, and stores representative images. The representative images include faces of various individuals. The storage unit 150 may be implemented as an optical recording medium, such as, a Digital Versatile Disk (DVD), a High Definition-DVD (HD-DVD), or Blue-Ray Disk (BD); a magnetic recording medium, such as, a Hard Disk Drive (HDD); or a semiconductor recording medium, such as, a memory card, or a flash memory. While some recording media have been explained above as examples, one will understand that any medium that is capable of recording an image signal can be used. Further, the storage unit 150 may be detachable from the camcorder 100, or can be integral within the camcorder 100, as in a hard drive.

The compressed image signals from the CODEC 140 and the representative images may be stored to separate recording media. According to one aspect of the present invention, the image compressed by the CODEC 140 is stored in a DVD, while the representative images are stored in a flash memory.

The user input unit 170 includes a variety of buttons to receive user commands. The control unit 160 controls the storage unit 150 to record the compressed images from the CODEC 140. Specifically, the control unit 160 controls the storage unit 150 to store the compressed images in the DVD, based on a scene unit (scene), while storing the representative images in the flash memory, in connection with each of the people. As referred to herein, a scene can be a single still image, or a video. The video can be defined by a start and a stop time of a video recording, or can be otherwise defined through editing of the captured video into discrete segments or scenes.

The control unit 160 also controls operations (such as, file copying, image comparison, or editing) of the recording media, which can be built in, or mounted to the storage unit 150. The control unit 160 compares the compressed images from the CODEC 140, with the representative images stored in the storage unit 150, to detect a scene including a person that matches the representative image of the storage unit 150. For example, the person could have a feature that matches a corresponding feature of the representative image. The feature can be, for example, a face, but is not limited thereto.

The control unit 160 may detect whether a particular person appears in an image, based on facial recognition. Specifically, the control unit 160 may detect faces of an image or a scene, using a facial recognition operation. The control unit 160 then compares the detected faces with the representative images from the storage unit 150, to determine whether the detected faces match the faces of the representative images, i.e., to identify the detected faces. According to the determination, the control unit 160 determines the person who is represented by the detected face, and searches for scenes in which the person appears. After the detection, the control unit 160 databases information about the detected scenes, and stores the database, with the images, in the storage unit 150.

The control unit 160 compares the compressed images from the CODEC 140, with the representative images of the storage unit 150. If a face detected in an image is not found in any of the representative images, the control unit 160 records the detected face as a representative image, and adds the new representative image to the storage unit 150. If the new representative image is added, the control unit 160 compares the images with the new representative image, to detect the scenes featuring the person in the representative image. Information about the detected scenes is stored in the database, with the images, on the storage unit 150.

Specifically, the control unit 160 generates, separately from the file of images, an information file which includes a database of the scenes showing each of the persons, and stores the information file in the DVD, or other medium, where the image file is stored. That is, by storing the information file along with the images, it is possible to refer to the scenes featuring a particular person, based on the information file, when the images are reproduced from the DVD. While not required, the information file can include a name of the person, or a thumbnail of the person, for easy reference.

In response to a user command, requesting editing of each person, input through the user input unit 170, the control unit 160 provides the display 130 with a list of persons appearing in the images, to enable a user to select and edit the images that feature each of the persons. The list can include images of one or more of the persons, for easy recognition by the users.

If a user selects a person from the list, the control unit 160 provides a screen through which the user can select operations, such as, a save operation, a delete operation, a skip operation, or a playback operation, with respect to the selected person. The editing process will be explained below, with reference to FIGS. 3A to 3C.

FIG. 2 is a flowchart provided to explain a detecting method, according to an exemplary embodiment of the present invention. In operation S210, the control unit 160 determines if the digital camcorder 100 is currently in an imaging mode.

If the digital camcorder 100 is determined to be in the imaging mode, in operations S220, the control unit 160 compares the images being captured with the pre-stored representative images stored in the storage unit 150. The representative images may include the faces of persons that have been previously identified.

In operation S230, the control unit 160 compares the images with the pre-stored representative images, to determine whether the person appearing in the images is identified in the representative images. If the person appearing in the images is new (not identified), that is, if the person is not included in the pre-stored representative images, in operation S240, one of the images showing the unidentified person is stored in the storage unit 150, as a representative image of the person, so as to identify the person.

If the person is not a new (is identified), that is, if the person is included in the pre-stored representative images, an image of the person is not stored in the storage unit 150. In operation S250, the control unit 160 detects the scenes in the stored images, in which the person appears. In operation S260, the control unit 160 databases the information about the scene detection, and stores the database, along with the images, in the storage unit 150. As such, the persons in new images are categorized while the images are being captured, or in some aspects can be categorized after the image capture is complete.

In operation S265, a determination is made as to whether a user editing command is entered through the user input unit 170. If a user editing command is received, in operation S270, the control unit 160 extracts the information about the scenes from the database, and provides the display 130 with a list of the persons appearing in the images. In operation S280, a determination is made as to whether a person is selected from the list. If a person is selected from the list, the control unit 160 edits the scenes in which the selected person appears, in operation S290.

Figure 3A:
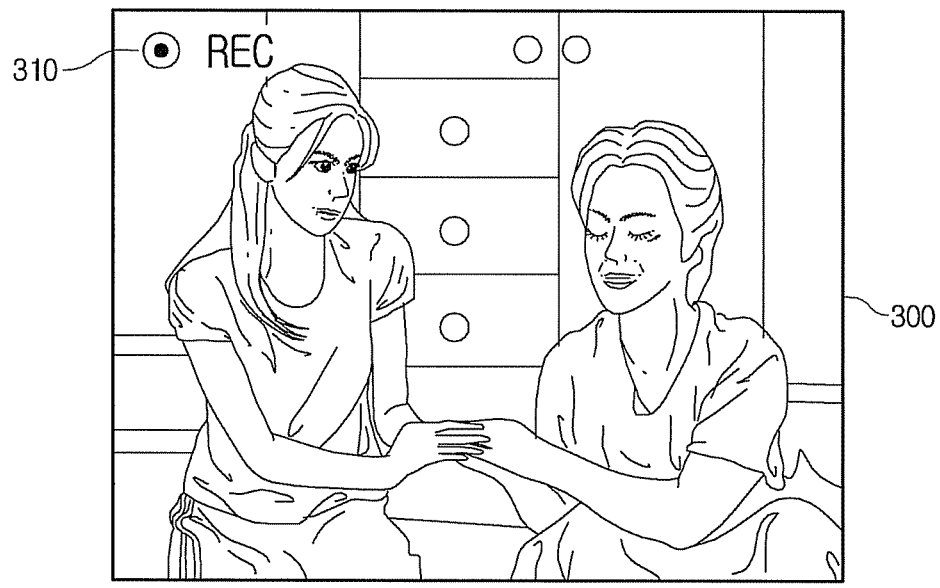
FIGS. 3A to 3C are provided to explain a process of editing a photographed image.
Figure 3B:
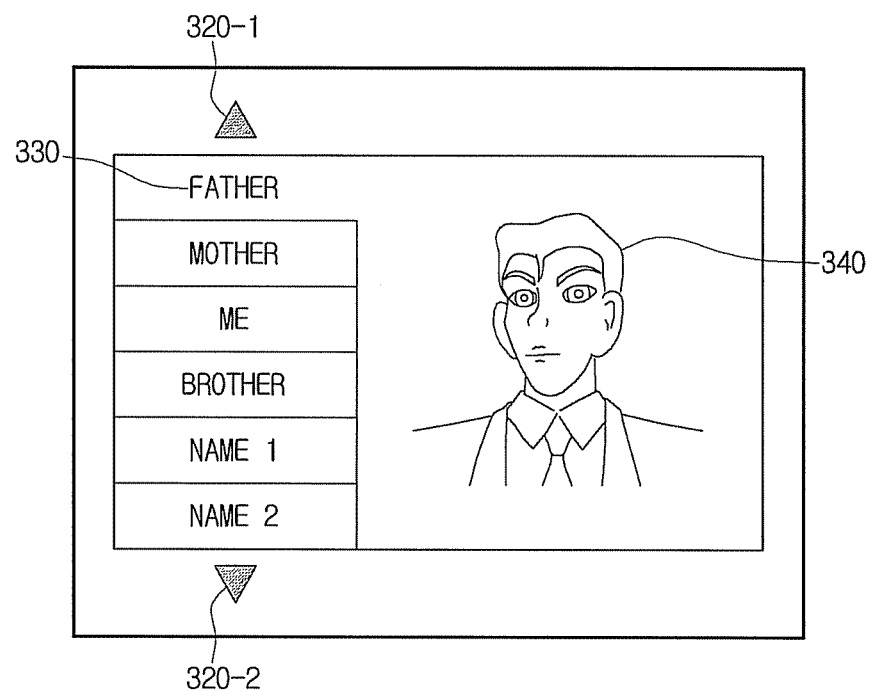
Figure 3C:
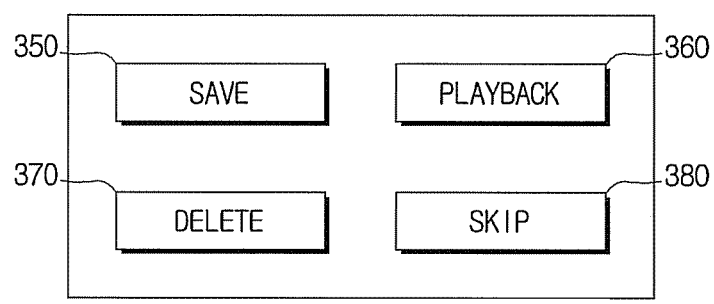

FIGS. 3A to 3C are provided to explain a process of editing an image or video, according to the selected persons. FIG. 3A illustrates an image 300, which is acquired through the imaging unit 110 of the digital camcorder 100, and output on the display 130. Two persons appear on the image 300, and an icon 310 (i.e., "REC") indicates that the imaging is in process, and the images are being recorded.

The control unit 160 detects the persons in the image 300, and compares the detected persons, with the representative images stored in the storage unit 150, to identify the persons in the image 300. The control unit 160 also detects the scenes that include the detected person or persons. After the detection, the control unit 160 databases the information about the detected scenes, and stores the database, with the scenes, on the storage unit 150. If the control unit 160 cannot identify one of the detected persons, an image that includes the unidentified person is stored in the storage unit 150, as one of the representative images, and the representative images are thus updated. In this way, the unidentified person is identified.

If the representative image is added, the control unit 160 compares the images generated by the imaging unit 110 with the newly added representative image, to detect the scenes which feature the person of the new representative image. Accordingly, the control unit 160 databases information about the detected scenes, and stores the database, with the images, in the storage unit 150.

FIG. 3B illustrates a list of persons appearing in a scene, provided on the display 130 of the digital camcorder 100. In response to an editing command input through the user input unit 170, the control unit 160 causes the display 130 to show the list. The list may include an identifying name section 330, a representative image section 340, and scroll bars 320-1 and 320-2. The identifying name section 330 indicates the names of the persons identified in the images.

The representative image section 340 shows the representative image corresponding to one of the names. FIG. 3B shows an example in which a representative image corresponding to the name 'father' is displayed.

The scroll bars 320-1 and 320-2 may be implemented as icons, which the user can use to scroll the list, to see other names which are not currently displayed. As explained above, the control unit 160 compares the images with the pre-stored representative images, to determine whether a person appearing in the images is a new person (has not been identified).

In FIG. 3B, the representative image 'father' is displayed in the representative image section 340. Since the currently displayed representative image is not acquired from the images, but instead was previously been named and stored in the storage unit 150, the storage unit 160 does not store the image that includes 'father' therein. Accordingly, the storage unit 150 does not again store the images, if the image of 'mother', 'me,' or 'brother' is displayed in the above manner.

Meanwhile, the untitled images 'NAME 1' and 'NAME 2' are not stored in the storage unit 150, but represent the scenes including new persons acquired from the images. Accordingly, one of the images featuring the new person is stored in the storage unit 150, as the person's representative image. A new name may be entered for representative image, by the user.

FIG. 3C illustrates a window, which is provided to edit the scenes including a person selected from the list of FIG. 3B. If a user selects 'father' from the list of FIG. 3B, the editing window of FIG. 3C appears, to select the type of editing. The editing window may include a save button 350, a playback button 360, a delete button 370, and a skip button 380. If the save button 350 is selected, the control unit 160 causes only the scenes that include images that feature the father to be stored.

If the playback button 360 is selected, the control unit 160 causes only the scenes that feature the father to be reproduced. If the delete button 370 is selected, the control unit 160 causes only the scenes that feature the father to be deleted. If the skip button 380 is selected, the control unit 160 causes only the scenes that feature the father to be skipped. As explained above, the images of the scenes are compared with the representative images, to enable easy editing of the scenes featuring an intended person.

While the images compressed in the CODEC 140 are stored in the DVD, and the representative images are stored in the flash memory, one will understand that these are mere examples of the present invention. Accordingly, any appropriate type of medium that is capable of recording an image signal, for example, an optical recording medium, such as, a DVD, an HD-DVD, or a BD; a magnetic recording medium, such as, a HDD; or a semiconductor recording medium, such as, a memory card, or a flash memory, may be implemented.

Further, while the digital camcorder 100 is implemented as an example to explain the process of editing the photographed images, one will understand that other imaging devices are applicable, such as a digital camera. Further, the images may be still images or video images. Moreover, aspects of the invention can utilize an exterior computer to perform certain operations, such as editing, in addition to, or instead of, the editing described therein.

Further, while the exemplary embodiment set forth above describes the process in which the images are compared with the representative images, and a new representative image of a person appearing in the images is added, if a representative image matching the person of the images is not found, one will understand that other examples are also applicable. For example, data about a face of a certain person may be directly input to the digital camcorder, and used to generate a representative image. Moreover, a user could replace a representative image with a more easily identifiable image, in other aspects.

While the exemplary embodiment set forth above describes the process in which the images are compared with the representative images, and the first image showing a face of each of the persons appearing in the images, is provided to the list of appearing persons, one will understand that other examples are possible. For example, the other images of the person, or the stored representative image, may be provided to the list of appearing persons, to provide multiple possible images for a same person.

While the editing functions include playback, delete, skip, and save operations, one will understand that more operations, such as, slow playback, or fast playback may be implemented as the editing functions, according to the exemplary embodiments of the present invention. Further, while the scene where a person appears is detected using a face recognition, one will understand that it is possible to use other types of human biometric recognition. For example, a manner of walking, a configuration of a hand, or voice in a video is applicable. While described in terms of a face being the identifiable feature, it is understood that other features can be used to identify persons. In addition, aspects can be used to identify objects in images, such as, cars, homes, or pets, in addition to, or instead of identifying persons.

While a new representative image is stored about a new person during imaging, other examples are possible. For example, if storing a representative image is unavailable during imaging, the images may be stored directly, and the representative image may be added later, that is, when the stored images are reproduced.

As explained above, according to the exemplary embodiments of the present invention, a user is able to rapidly find the images of an intended person. Furthermore, the user is able to edit selected scenes, without experiencing the inconvenience of having to use functions, such as fast playback. Aspects of the invention can be implemented using software stored on a computer readable medium, for use by one or more processors and/or computers.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An imaging device, comprising:
a first storage module to store representative images, each representative image including a face of an identified person;
an imaging module to generate images;
a second storage module to store the generated images as a plurality of scenes; and
a processor in electronic communication with the first storage module, the imaging module, and the second storage module to detect persons included in the plurality of scenes, to compare the detected persons in the plurality of scenes to the representative images stored in the first storage module, so as to identify the detected persons, to detect scenes from the plurality of scenes by determining which of the plurality of scenes include at least one of the detected identified persons, and to control the second storage module to store information linking the at least one of the detected identified persons included in the detected scenes with the detected scenes, along with the generated images, the processor to provide a list of persons appearing in the plurality of scenes so that if at least one of the persons is selected from the list of persons, the processor edits the generated images that include the selected person, using information about the detected scenes.

2. The imaging device of claim 1, wherein, if an unidentified person is detected, the processor adds one of the images that includes the detected unidentified person, to the representative images stored in the first storage module, so as to identify the unidentified person.

3. The imaging device of claim 2, wherein the processor detects which of the plurality of scenes include the previously unidentified person, and controls the second storage module to store information about the detected scenes with the generated images.

4. The imaging device of claim 1, wherein the list of persons includes an image that includes the face of one of the persons appearing in the list of persons.

5. The imaging device of claim 1, wherein the editing process comprises at least one of a save operation, a playback operation, a delete operation, and a skip operation, for scenes that include at least the selected person.

6. The imaging device of claim 1, wherein the imaging device is a camcorder housing the first storage module, the second storage module, the processor, and the imaging module.

7. A detecting method, comprising:
generating, by an imaging device, images;
storing, by the imaging device, the generated images as a plurality of scenes;
detecting, by the imaging device, persons included in the generated images;
comparing, by a processor of the imaging device, the detected persons with stored representative images, that include faces of identified detected persons, to identify the detected persons;
detecting, by the imaging device, scenes that include at least one of the identified detected persons;
storing, by the imaging device, information about the detected scenes, along with the generated images;
providing a list of persons appearing in the plurality of scenes; and
if a person is selected from the list of persons, editing a scene in which the selected person appears, using the information about the detected scenes.

8. The detecting method of claim 7, wherein, if an unidentified face of a person appears in the generated images, the method further comprises adding at least one of the images that includes the unidentified face of the person, to the representative images, so as to identify the unidentified face of the person.

9. The detecting method of claim 8, further comprising detecting scenes in which the previously unidentified face of the person appears, and storing information about the detected scenes with the generated images.

10. The detecting method of claim 7, wherein the list of persons includes an image that includes the face of one of the persons appearing in the list of persons.

11. The detecting method of claim 7, wherein the editing process comprises at least one of a save operation, a playback operation, a delete operation, and a skip operation.

12. An imaging device, comprising:
a first storage module to store a representative image;
an imaging module to generate images;
a second storage module to store the generated images as a plurality of scenes; and a processor to detect an object included in the generated images, to identify the detected object by comparing the detected object with the representative image, and to store information identifying which of the generated images of the plurality of scenes include the identified object, in the second storage module, the processor to provide a list of persons appearing in the plurality of scenes so that if the processor determines the object as an identified detected person in the list of persons, the processor edits the generated images that include the identified detected person, using information about the generated images of the plurality of scenes.

13. The imaging device of claim 12, wherein the information comprises a database file linking the identified detected person and corresponding generated images having the identified detected person, and is stored on the second storage module, amongst the generated images.

14. The imaging device of claim 12, wherein the processor detects the person using facial recognition.

15. The imaging device of claim 12, wherein when the processor cannot identify the detected object using the representative image, the processor stores an image of the detected object, as another representative image, in the first storage module.

16. A detecting method, comprising:
generating images in an image forming device;
storing the generated images in a first storage medium of the image forming device;
detecting a person included in the generated images, using a processor of the image forming device;
comparing the detected person with representative images stored in a second storage medium to identify the detected person, using the processor of the image forming device;
determining which of the generated images include the identified detected person, to obtain a result linking the identified detected person to a corresponding generated image, using the processor of the image forming device;
storing the result along with the generated images, in the first storage medium;
selecting the detected person from a list of the detected persons; and
editing the generated images that include the selected detected person, using the result of the determination.

17. The method of claim 16, further comprising: adding an image of the detected person to the stored representative images, if the detected person is not identified.

18. The method of claim 16, wherein the first storage medium is detachable from the image forming device.

19. The method of claim 16, wherein the generated images are videos.

20. The method of claim 16, wherein the generated images are still images.

* * * * *